(No Model.)
H. BERNTSEN.
CAN OPENER.
No. 579,086. Patented Mar. 16, 1897.
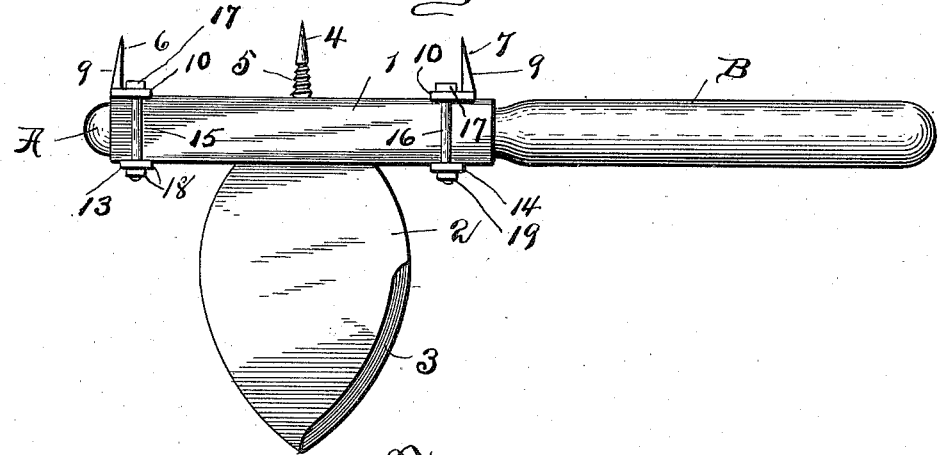
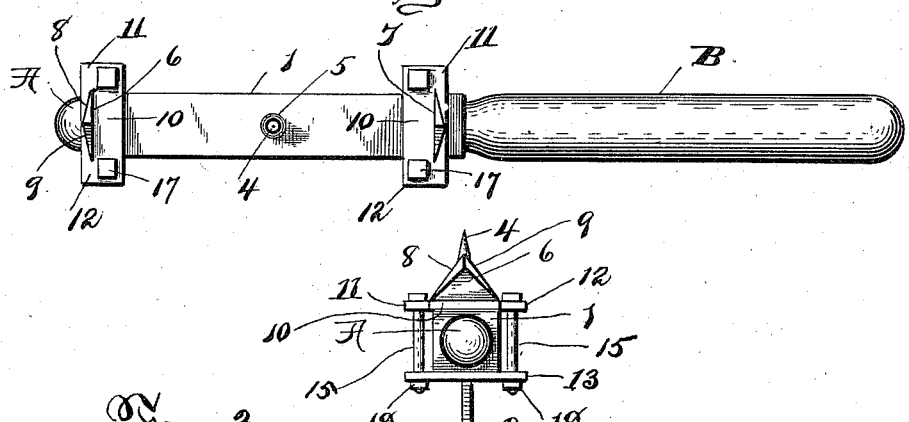
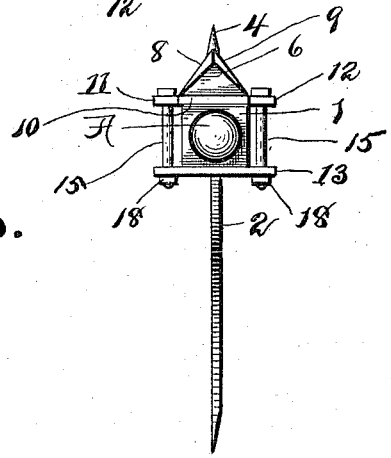
Witnesses
Marcus L. Byng.
K. A. Nau.
Inventor,
Hans Berntsen,
by John Wedderburn
Attorney

UNITED STATES PATENT OFFICE.

HANS BERNTSEN, OF CAMBRIDGE, MASSACHUSETTS.

CAN-OPENER.

SPECIFICATION forming part of Letters Patent No. 579,086, dated March 16, 1897.

Application filed June 22, 1896. Serial No. 596,452. (No model.)

*To all whom it may concern:*

Be it known that I, HANS BERNTSEN, a citizen of the United States, residing at Cambridge, in the county of Middlesex and State of Massachusetts, have invented certain new and useful Improvements in Can-Openers; and I do hereby declare the following to be a full, clear, and exact description of the invention, such as will enable others skilled in the art to which it appertains to make and use the same.

My invention relates to can-openers.

My object is to provide a simple and cheap can-opener which will be adapted for use in connection with cans of different diameter, and which after cutting out the top of the can will hold the same and prevent it from dropping back, to the injury of the contents of the can.

A further object is to provide a can-opener capable of use in other connections.

Having these objects in view my invention consists of a can-opener comprising certain novel features and combinations appearing more fully hereinafter.

In the accompanying drawings, Figure 1 is a front elevation of my improved can-opener; Fig. 2, a top plan view, and Fig. 3 an end elevation.

A designates a cylindrical shank, and B a handle formed in one piece.

The numeral 1 designates an elongated casing or housing which snugly receives shank A and is square in cross-section. A trowel-shaped can-opening blade 2 is formed integral with the casing 1 and projects from the lower face thereof, the right-hand edge of this cutting-blade being beveled, as at 3, and said bevel extending from the point of the cutting-blade upward for about half the length thereof. This cutting-blade is used in opening large cans, and when so employed blows are directed on the top of the casing and a cut made around the outer edge of the can-top.

The numeral 4 designates a pivot-pin, which, together with its screw-threaded portion 5, is conical in shape. The screw-threaded portion of the pin is screwed through casing 1 and into shank A. It will be observed that this pivot-pin is located at the central point of the length of the shank. I employ two cutting-knives 6 and 7, which are duplicates. The blades of these knives are triangular and provided with beveled edges 8 and 9. Each cutting-knife is provided with a base 10, whose ends project over the sides of the casing, as at 11 and 12.

The numerals 13 and 14 designate clamping-plates which are located diametrically opposite the cutting-knives. Sets of bolts 15 and 16, having heads 17 on their upper ends, pass through the projecting portion of the base of each cutting-knife and its respective clamping-plate. Adjusting thumb-nuts 18 and 19 are located on the lower ends of the bolts and serve to hold the clamping-plate and knife in position on the casing. The respective cutting-knives are thus rendered adjustable longitudinally of the casing and in relation to the pivot-pin, so that a circle of any desired diameter may be cut, thereby rendering my improved can-opener applicable to cans of different sizes.

The can-opener is used in the following manner: If it is desired to make a clean circular cut, the cutting-knives are adjusted on the casing according to the diameter of the can. The pivot-pin is then forced through the can-top at a central point thereof and the handle swung around until the top has been cut through. As soon as this happens the top is forced onto the tapering screw-threaded pin, where it is held and prevented from dropping back into the can, to the injury of the contents thereof. The can-top can now be easily removed from the pivot-pin. If large-sized cans have to be dealt with, the large cutting or opening blade is employed and used, as before described. This cutting-blade may also be employed as an ice pick or shaver or in any other connection, according to its adaptability.

Having now described my invention, what I claim as new, and desire to secure by Letters Patent, is—

In a can-opener, the combination with a handle flattened longitudinally on opposite sides, of a threaded tapering pivot-pin provided with a blank portion and connected to the handle, said pin projecting from one of the flattened sides thereof, cutting devices on opposite sides of the pivot-pin which comprise triangular cutting-knives having beveled edges and bases extending in right-angular relation to the knives, said bases being located on the same side as the pivot-pin and pressing against the flattened face or side, the aforesaid bases having portions which project out on opposite sides of the handle, clamping-plates located against the other flattened portion of the handle and provided with similar projecting ends, independent bolts passing through the projecting portions of the bases and plates and situated on opposite sides of the handle, and nuts on said bolts.

In testimony whereof I have signed this specification in the presence of two subscribing witnesses.

HANS BERNTSEN.

Witnesses:
 SAMUEL JENNISON,
 H. A. CHESTER.